United States Patent
Arabia, Jr. et al.

[11] Patent Number: 6,050,619
[45] Date of Patent: Apr. 18, 2000

[54] CABLE ACTUATOR SYSTEM

[75] Inventors: Frank Joseph Arabia, Jr., Macomb Township, Macomb County; Donald Michael Perkins, Rochester Hills; Ian Martin, Waterford, all of Mich.

[73] Assignee: General Motors Corporation, Detroit, Mich.

[21] Appl. No.: 09/106,409

[22] Filed: Jun. 29, 1998

[51] Int. Cl.$^7$ .................................................... E05C 3/06
[52] U.S. Cl. .................... 292/216; 292/225; 292/DIG. 25
[58] Field of Search ............................. 292/50, DIG. 25, 292/225, 216, 201; 70/256

[56] References Cited

U.S. PATENT DOCUMENTS

| | | | |
|---|---|---|---|
| 5,277,461 | 1/1994 | Dzurko et al. | 292/216 |
| 5,531,489 | 7/1996 | Cetnar | 292/225 |
| 5,647,234 | 7/1997 | Foster | 70/256 |
| 5,720,506 | 2/1998 | Arabia, Jr. et al. | 292/216 |
| 5,738,394 | 4/1998 | Arabia, Jr. et al. | 292/216 |
| 5,803,515 | 9/1998 | Arabia, Jr. et al. | 292/216 |
| 5,853,060 | 12/1998 | Choa et al. | 180/69.2 |

*Primary Examiner*—Flemming Saether
*Assistant Examiner*—John B. Walsh
*Attorney, Agent, or Firm*—Kathryn A. Marra

[57] ABSTRACT

A cable actuator assembly operates a door latch that has inside lock and latch operating levers that are coupled by a cam and follower arrangement and rotate in opposite directions. The cable actuator assembly includes a cable assembly and an actuator assembly. The cable assembly has a sheath and a core that slides in the sheath. The actuator assembly has an anchor fixed on a base and a bell crank lever pivotally mounted on the base. The sheath is attached to the anchor at one end and to the inside operating lever of the door latch at the opposite end with slack. The core is attached to the bell crank lever at one end and to the inside lock operating lever at the opposite end. The bell crank lever is rotated by a handle to rotate the inside lock and latch operating levers so as to unlock and unlatch the door latch in sequence.

13 Claims, 3 Drawing Sheets

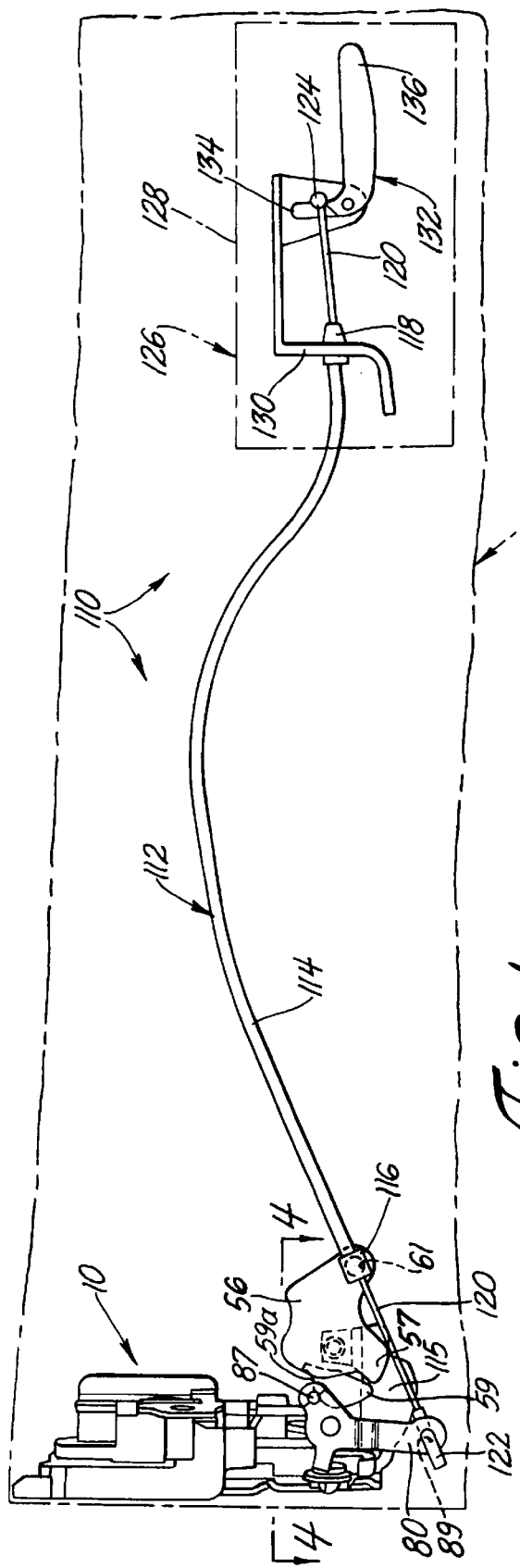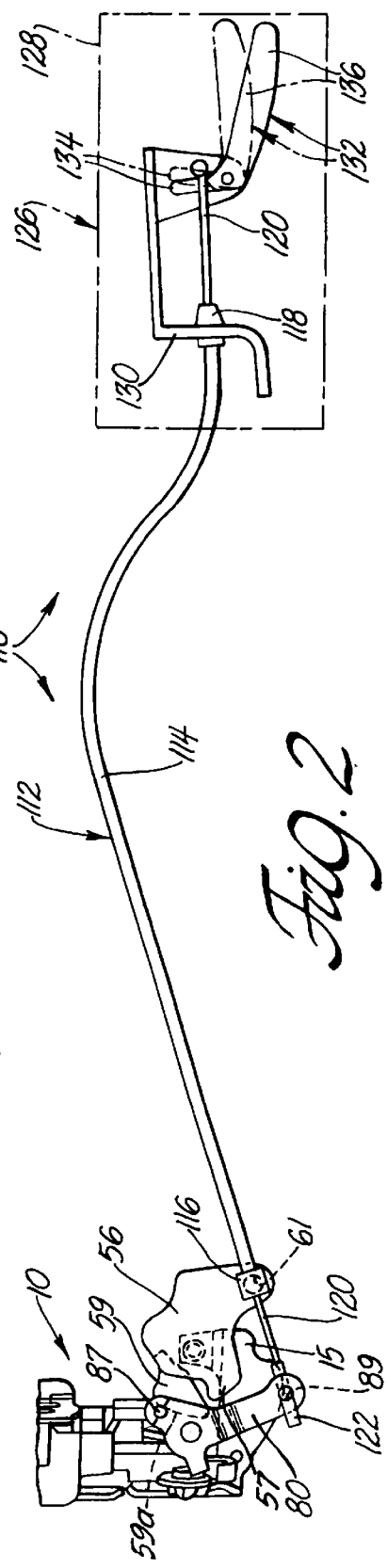

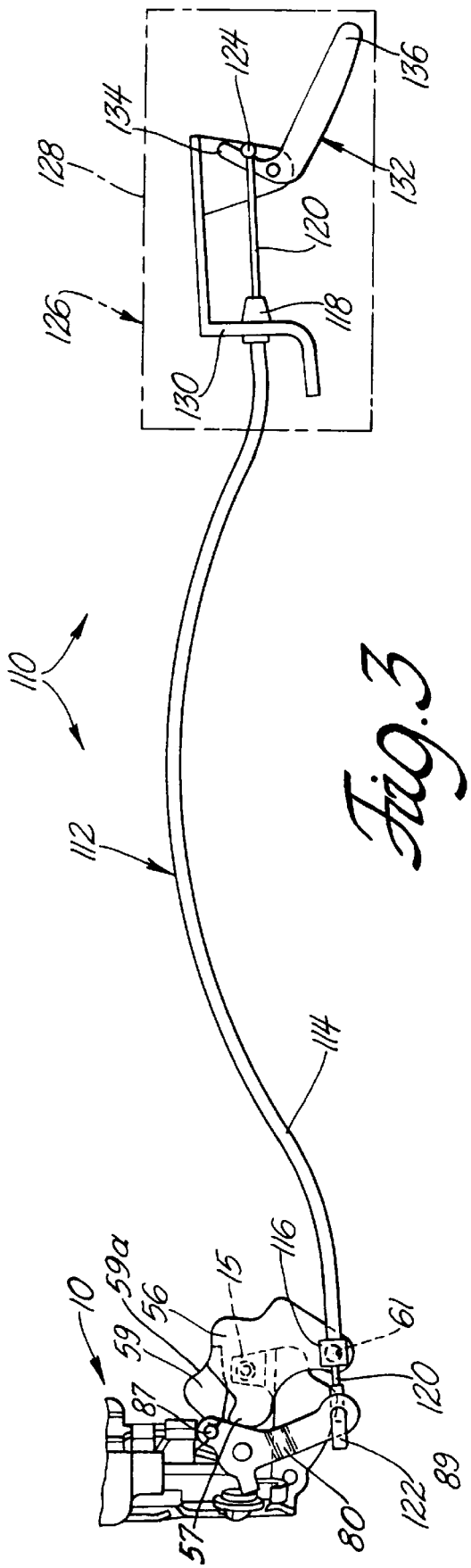
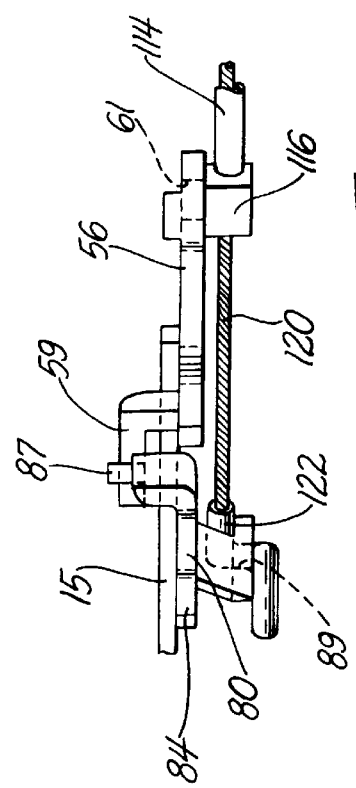
Fig. 3
Fig. 4

CABLE ACTUATOR SYSTEM

TECHNICAL FIELD

This invention relates generally to a cable actuator system and more particularly to a cable actuator system for the remote operation of a mechanical device that has two operating levers such as a door latch that has inside lock and latch operating levers.

BACKGROUND OF THE INVENTION

An automotive closure, such as a door for an automobile passenger compartment, is hinged to swing between open and closed positions and conventionally includes a door latch that is housed between inner and outer panels of the door. The door latch functions in a well-known manner to latch the door when it is closed and to lock the door in the closed position or to unlock and unlatch the door so that the door can be opened manually. The door latch is operated remotely from the exterior of the automobile by two distinct operators—a key lock cylinder that controls the locking function and a handle or push button that controls the latching function. The door latch is also operated remotely from inside the passenger compartment by two distinct operators—a sill button or electric switch that controls the locking function and a handle that controls the latching function. Each operator is accessible outside the door structure and extends into the door structure where it is operatively connected to the door latch mechanism by an actuator assembly which in some instances include a cable assembly located inside the door structure.

U.S. Pat. No. 5,277,461 granted to Thomas A. Dzurko et al Jan. 11, 1997 for a vehicle door latch, which is hereby incorporated in this patent specification by reference, discloses a typical door latch. The door latch disclosed in the Dzurko '461 patent includes an inside latch operating lever that is pivotally mounted on a flange of a metal face plate and that is connected by a suitable linkage for rotation by an inside door handle (not shown). (See column 4, lines 10–18 of the Dzurko '461 patent.) The door latch also includes an inside lock operating lever 80 that is pivotally mounted on the flange of the metal face plate near the inside latch operating lever. The inside lock operating lever is operated by an inside sill button or lock slide. (See column 5, lines 46–58 and column 6, lines 8–15 of the Dzurko '461 patent.) The door latch disclosed in the Dzurko '461 patent is released from the passenger compartment in two stages. First, the inside lock operating lever is rotated counterclockwise by an inside sill button or lock slide to unlock the door latch. Then, the inside latch operating lever is rotated clockwise by an inside door handle to unlatch the door latch so that the vehicle door may be opened manually.

Door latches of the type disclosed in the Dzurko '461 patent have been used successfully by General Motors Corporation for many years. However, up to this time it has been necessary to provide two separate actuators for operating the two operating levers that unlock and unlatch the door from inside the passenger compartment.

SUMMARY OF THE INVENTION

The object of this invention is to provide a cable actuator system that actuates two operating levers, such as the inside latch and lock operating levers of a door latch, with a single cable actuator assembly.

A feature of the cable actuator system of the invention is that the cable actuator system includes a push-pull cable that has a sheath that actuates an operating lever.

Another feature of the cable actuator system of the invention is that the cable actuator system includes a push-pull cable that has a core that actuates one operating lever and a sheath that operates another operating lever.

Another feature of the cable actuator system of the invention is that he cable actuator system includes a push-pull cable that has a sheath that is attached to an operator at one end and to an operating lever at the opposite end with slack.

Yet another feature of the cable actuator system of the invention is that the cable actuator system has a single operator that actuates two operating levers in a predetermined sequence.

Still another feature of the cable actuator system of the invention is that the cable actuator system has a single operator that rotates two operating levers in opposite directions.

Still yet another feature of the invention is that the cable actuator system of the invention has a single operator that rotates a first operating lever to a limit in one direction to achieve a first function, such as unlocking a door latch, and then continues rotation of a second operating lever in an opposite direction to achieve a second function, such as unlatching the door latch.

These and other objects, features and advantages of the invention will become apparent from the description below, which is given by way of example with reference to the accompanying drawings.

BRIEF DESCRIPTION OF THE DRAWINGS

FIG. 1 is an elevation view of a vehicle door that is equipped with a door latch and a cable actuating system for operating the door latch in accordance with the invention and showing the door latch and system parts in a locked and latched position;

FIG. 2 is an elevation view similar to FIG. 1 showing the door latch and system parts in an unlocked but latched position;

FIG. 3 is an elevation view similar to FIGS. 1 and 2 showing the door latch and system parts in an unlocked and unlatched position;

FIG. 4 is a view taken substantially along the line 4—4 of FIG. 1 looking in the direction of the arrows.

DESCRIPTION OF THE PREFERRED EMBODIMENT

Figure 5:
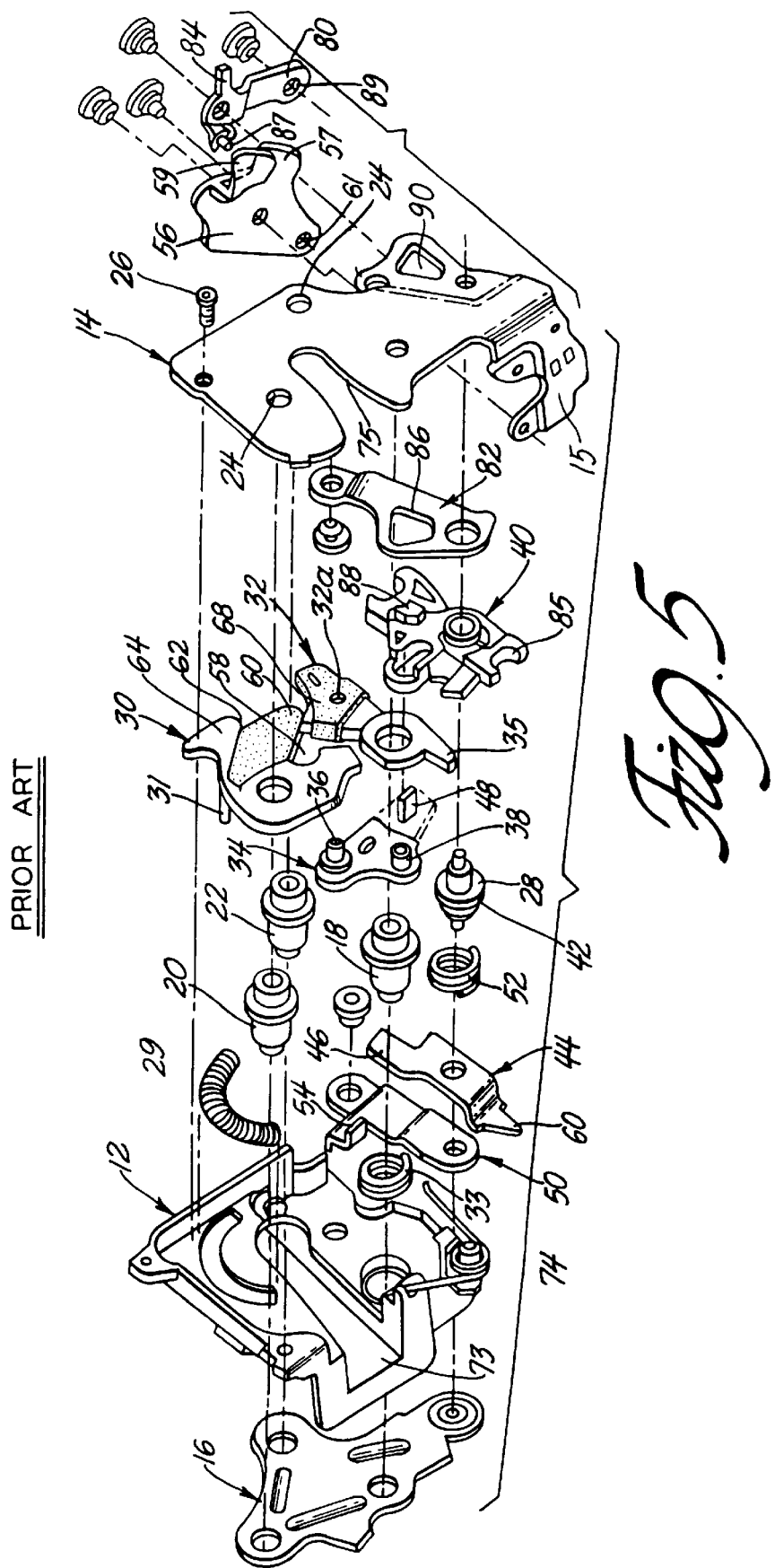
FIG. 5 is an exploded perspective view of the door latch shown in FIGS. 1, 2, 3 and 4.

Referring now to FIG. 1, an automotive closure, such as a vehicle door, is generally indicated at 100. The vehicle door 100 is hinged to swing between open and closed positions in a conventional manner and includes a vehicle door latch generally indicated at 10. As indicted above, the vehicle door latch 10 is described in detail in U.S. Pat. No. 5,277,461 granted to Thomas A. Dzurko et al Jan. 11, 1997 for a vehicle door latch which has been incorporated in this patent specification by reference.

Referring now to the exploded perspective view of FIG. 5, the vehicle door latch 10 has a multi-piece enclosure that comprises plastic housing 12, metal faceplate 14 and metal back plate 16. The plastic housing 12 and the metal back plate 16 are held together by three flanged, internally threaded bushings 18, 20 and 22 that are inserted into three holes in the plastic housing 12, then through three aligned holes in the back plate 16 and then flanged over the back plate. The metal face plate 14 has three bolt holes 24 that are aligned with the bushings 18, 20 and 22 when the metal face plate is attached to the plastic housing 12 by a screw 26. The metal face plate 14 and the metal back plate 16 have lower portions below the plastic housing 12 that are held together by a flanged stud 28 that has projecting pins at each end that are inserted in holes in the plates and peened or headed over.

The Latching Mechanism

The latching mechanism of the vehicle door latch 10 comprises a fork bolt 30 and a cooperating detent 32 that are pivotally mounted on bushings 20 and 18, respectively, and located in a chamber of the plastic housing 12 behind the metal face plate 14. The fork bolt 30 is biased clockwise by a coil spring 29. Coil spring 29 is disposed in a curved slot in the plastic housing 12 behind the fork bolt 30, and it engages a depending pin 31 of the fork bolt 30 at one end. Detent 32 is biased counterclockwise into engagement with the fork bolt 30 by a coil spring 33 that surrounds the bushing 18 and that has one end engaging an ear 35 of the detent 32. Detent 32 engages and holds the fork bolt lever 30 in a primary latched position against the bias of spring 29 as shown in FIG. 5. Detent 32 also can engage fork bolt 30 at 62 and hold it in an intermediate secondary latched position. Detent 32 engages fork bolt 30 at foot 64 in its unlatched position.

The latching mechanism further comprises an intermittent lever 34 for operating the detent 32. The intermittent lever 34 is located in the chamber of the plastic housing 12 behind detent 32. It has two integral pivot pins 36 and 38. Pivot pin 36 is journalled in a hole 32*a* in detent 32 so that the detent 32 rotates clockwise from the position shown in FIG. 5 (and out of latched engagement with the fork bolt 30) to the unlatched position when the intermittent lever 34 is pulled down. The pivot pin 38 is disposed in a slot of a locking lever 40 that pivots the intermittent lever 34 counterclockwise about pivot pin 36 from the unlock position shown in FIG. 5 to a lock position (not shown). The locking lever 40 is journalled on the stud 28 between the flange 42 and the faceplate 14. Briefly, the locking lever 40 is rotated clockwise to lock the door latch 10 or counterclockwise to unlock the door latch. Clockwise rotation pivots intermittent lever 34 counterclockwise about pivot pin 36 to a position where it is uncoupled from and out of the path of travel of transfer lever 44 described below. A more complete description of the locking lever 40 and locking mechanism is given after the latching mechanism is described.

The latching mechanism further comprises a transfer lever 44 that is journalled on a reduced diameter portion of the stud 28 spaced rearwardly of the flange 42. The transfer lever 44 has an ear 46 at one end that is engageable with an integral, rearwardly projecting tab 48 of the intermittent lever 34 so that the intermittent lever 34 is pulled down when the transfer lever 44 is rotated clockwise as viewed in FIG. 5.

The latching mechanism further comprises an outside latch operating lever 50 and a coil return spring 52. The outside latch operating lever 50 is also journalled on the reduced diameter portion of the stud 28 behind the transfer lever 44. It has a bent tab 54 that engages the ear 46 of the transfer lever 44 so that the outside latch operating lever 50 rotates the transfer lever 44 clockwise when it is rotated clockwise on stud 28. The outside latch operating lever 50 is connected by suitable linkage for rotation by an outside door handle (not shown).

The coil return spring 52 is disposed around the stud 28 and located between the flange 42 and the transfer lever 44. One end of the coil spring 52 engages the bottom of transfer lever 44, and the other end engages the bottom of the plastic housing 12 above the transfer lever 44 so that the transfer lever 44 and outside operating lever 50 are biased counterclockwise to a rest position where tab 54 engages the bottom of the plastic housing 12.

The latching mechanism further comprises an inside latch-operating lever 56 that is pivotally mounted on a flange 15 of the metal faceplate 14. The inside latch operating lever 56 has a generally flat body that has a tab 57 that engages a second ear 60 of transfer lever 44 so that the inside latch operating lever also rotates the transfer lever 44 clockwise when it is rotated counterclockwise as shown in FIG. 5. The inside latch operating lever 56 has a cam arm 59 that is laterally offset and generally parallel to its generally flat body. Inside latch operating lever 56 also has a hole 61 by which it is connected to a cable actuator assembly 110 shown in FIGS. 1–4 for rotation by an inside door handle as explained in detail below.

Fork bolt 30 has a conventional slot or throat 58 for receiving and retaining a strike member that is attached to the vehicle door pillar to latch the vehicle door in the closed position (not shown). Fork bolt 30 also includes a primary latch shoulder 60, an intermediate secondary latch shoulder 62 and a radially projecting foot 64. Fork bolt 30 preferably has a plastic coating that covers a surface of the slot 58 that is engaged by the striker for energy absorption and quiet operation when the vehicle door is slammed shut.

Detent 32 has a sector-shaped catch 68 that engages the radially projecting foot 64 when the fork bolt 30 is in the unlatched position (not shown). The sector-shaped catch 68 positively engages the primary and secondary latch shoulders 60 and 62 to hold the fork bolt 30 in either the primary or the intermediate secondary latched positions shown in FIG. 5 and not shown, respectively. Detent 32 also preferably includes a plastic coating that has an integral bumper. The bumper engages the bushing 22 to stop counterclockwise pivoting of the detent lever 32 under the bias of spring 33. This bumper also absorbs energy and quiets operation when the door is slammed shut.

The conventional latching mechanism described above operates as follows. When the door latch 10 is in an unlatched and unlocked condition, fork bolt 30 is poised to receive a conventional strike member (not shown) that projects into aligned fish mouth slots 73 and 75 of the plastic housing 12 and the metal face plate 14 when the door is shut. The entering strike member engages the plastic coating at the back of the throat 58 and rotates fork bolt 30 counterclockwise against the bias of spring 29 until fork bolt 30 is rotated to the primary latch position shown in FIG. 5 where fork bolt 30 captures the striker in the throat 58. Fork bolt 30 is held in the primary latch position by catch 68 of detent 32 engaging the primary latch shoulder 60 of fork bolt 30.

Catch 68 rides along the periphery of the fork bolt 30 under the bias of spring 33 as fork bolt 30 rotates counterclockwise from the unlatched position to the primary latch position shown in FIG. 5. During this travel, catch 68 rides under the foot 64 into engagement with the intermediate secondary latch shoulder 62 and then under the coated portion into engagement with the primary latch shoulder 60. It is to be noted that the engagement of catch 68 with the intermediate secondary latching shoulder 62 is sufficient to hold the vehicle door closed in the event that the vehicle door is not shut with sufficient force so that catch 68 engages primary latch shoulder 60.

The vehicle door latch 10 is not locked so that the vehicle door can be opened simply by operating either an inside or outside door handle or the like to rotate the transfer lever 44 clockwise and the ear 46 down as viewed in FIG. 5. Ear 46 engages projection 48 of intermittent lever 34 and pulls the intermittent lever 34 down from the primary latch position shown in FIG. 5. As the intermittent lever 34 is pulled down, it rotates detent 32 clockwise against the bias of spring 33 from the primary latch position shown in FIG. 5. Fork bolt 30 is then free to rotate counterclockwise under the bias of spring 29 from the primary latch position shown in FIG. 5 to an unlatched position as the striker is pulled out of the aligned fish mouth slots 73 and 75 when the vehicle door is opened.

The Lock Mechanism

The lock mechanism is actuated by rotating the locking lever 40 that is journalled on stud 28 between flange 42 and faceplate 14 clockwise. Clockwise rotation of the locking lever 40 rotates intermittent lever 34 counterclockwise about the pivot pin 36 that is journalled in the detent 32 due to the engagement of the second pivot pin 38 of the intermittent lever 34 in the slot of the locking lever 40. Intermittent lever 34 is thus rotated counterclockwise from the unlocked position shown in FIG. 5 to a locked position where projection 48 is repositioned out from under ear 46 of transfer lever 44. Consequently, when the door handles or the like are operated so as to rotate the transfer lever 44 clockwise to the unlatching position, the ear 46 simply bypasses the projection 48 without transferring any motion to the intermittent lever 34. Consequently, intermittent lever 34 is not pulled down to rotate detent 32 to the unlatch position. In other words, the transfer lever 44 simply free wheels so that operation of the door handles or their equivalent is not effective.

The locking mechanism further comprises an inside lock operating lever 80 and an outside lock operating lever 82. Inside lock operating lever 80 is pivotally mounted on flange 15 of the metal face plate 14 at a location spaced forwardly of the pivot for the inside latch operating lever 56, that is, toward face plate 14. Inside lock operating lever 80 has an ear 84 that fits in a slot 85 at one end of locking lever 40. Inside lock operating lever 80 also has a follower pin 87 that cooperates with cam arm 59 as explained below. Outside operating lever 82 is pivotally mounted on stud 28 in front of locking lever 40. Locking lever 40 has a protuberance 88 that projects through a sector-shaped hole 86 in outside lock operating lever 82 and then through a smaller sector shaped hole 90 in faceplate 14.

Protuberance 88 and sector-shaped hole 90 limit rotation of locking lever 40 from an unlocked position shown in FIG. 4 where protuberance 88 engages the upper edge of hole 90 to a locked position (not shown) where protuberance 88 engages the lower edge of hole 90.

Locking lever 40 is rotated clockwise from the unlocked position shown in FIG. 5 to the locked position by rotating inside lock operating lever 80 counterclockwise as viewed in FIG. 5. Inside lock operating lever 80 has a hole 89 for connection to and actuation by cable actuator assembly 110 shown in FIGS. 1–4 as explained below.

Locking lever 40 can also be rotated clockwise from the unlocked position shown in FIG. 4 to the locked position by rotating outside lock operating lever 82 clockwise. Outside lock operating lever 82 is generally actuated by a key lock cylinder through a suitable linkage (not shown). Locking lever 40 also has a slot 91 for operating the locking lever 40 by a linear electric or vacuum motor.

The Cable Actuator Assembly

The vehicle door 100 is equipped with a cable actuator assembly 110 for operating the door latch 10 from a remote location inside the vehicle passenger compartment as shown in FIGS. 1–4. The cable actuator assembly 110 comprises a cable assembly 112 having a sheath 114 that has sheath connectors 116, 118 at opposite ends. A core 120 slides in sheath 114 and has core connectors 122, 124 at opposite ends.

The cable actuator assembly 110 further comprises an operator assembly 126 that has a base 128 that is inside the vehicle door. The base 128 includes an anchor bracket 130 that is inside the door and an operator 132 that is pivotally mounted on anchor bracket 130. The operator 132 has an attachment portion 134 inside the door and extends through the interior trim panel of the vehicle door 100 to provide a handle portion 136 in the passenger compartment. In this particular instance, the operator 132 is a bell crank lever having an interior lever arm that provides attachment portion 134 inside the door and a second lever arm that provides a door handle 136 for actuating the door latch 10 from inside the vehicle. It should be understood that other types of operators can be used so long as the operator produces a displacement of core 120 with respect to anchor bracket 130. For instance, operator 132 could be in the form of a slide that translates relative to base 128 or a bell crank lever that pivots on base 126 about a vertical axis. Moreover, any type of cable assembly can be used so long as the sheath and the core are both capable of acting in compression and in tension.

The cable assembly 112 is attached to door latch 10 and operator assembly 126 in the following manner. Core connector 122 is attached to inside lock operating lever 80 by means of hole 89, and the core connector 124 at the opposite end of the core is attached to attachment portion 134 of operator 132. Sheath connector 116 is attached to inside latch operating lever 56 by means of hole 61, and the sheath connector 118 at the opposite end of the sheath is connected to anchor 130.

FIG. 1 shows inside latch operating lever 56 and inside lock operating lever 80 in operating positions where door latch 10 is latched and locked. In this condition, core connector 122 and attachment hole 89 of lock operating lever 80 are at a maximum distance from operator 132, and sheath connector 116 and attachment hole 61 of latch operating arm are at a minimum distance from anchor bracket 130. Sheath connector 116 and core connector 122 are also at a maximum distance from each other while sheath connector 118 and core connector 124 are at a minimum distance from each other.

Cable assembly 112 is purposely elongated so that sheath 114 is longer than the distance between the connection points for sheath connectors 116 and 118, resulting in considerable slack in cable assembly 112 between these two attachment points when cable assembly 112 is attached as shown in FIG. 1.

The cable actuator assembly 110 unlocks and unlatches the door latch 10 in the following manner. FIG. 1 shows the door latch 10 in a latched and locked condition and the interior door handle 136 in a horizontal position that corresponds to the locked and latched condition of the door latch. The door latch 10 is unlocked and unlatched simply by rotating the door handle 136 clockwise to an intermediate unlock position shown in solid line in FIG. 2 and then continuing rotation to an unlatch position shown in FIG. 3. This action produces two phases or sets of reactions that are controlled by cam arm 59 and follower pin 87. In the first phase, core 120 pulls lock operating lever 80 toward anchor bracket 130, rotating lock operating lever 80 counterclockwise in FIG. 1 (clockwise in FIG. 5). Sheath 114 simultaneously pushes latch operating lever 56 away from anchor bracket 130 rotating latch operating lever clockwise in FIG. 1 (counterclockwise in FIG. 5) due to the engagement of cam arm 59 with follower pin 87. The relative angular displacement of the lock operating lever 80 and the latch operating lever 56 as those two levers rotate toward each other is determined by the shape of the cam surface 59a that is engaged by follower pin 87. This first set of reactions rotates locking lever 40 clockwise from the position shown in FIG. 1 until the protuberance 88 of locking lever 40 bottoms out against the top edge in hole 90 (shown in FIG. 5) which unlocks the door latch 10. Lock operating lever 80 and door handle 132 are now in the positions shown in FIG. 2 where door latch 10 is unlocked but still unlatched. It is substantially at this point that tab 57 engages ear 60 of transfer lever 44 (see FIG. 5).

As door handle 136 moves further in the clockwise direction from the position shown in FIG. 2 in the second phase, sheath 114 continues pushing sheath connector 116 toward core connector 122, rotating inside latch operating lever 56 further clockwise from the position shown in FIG. 2 (counterclockwise in FIG. 5). However, lock operating lever 80 does not move because locking lever 40 is bottomed out and because cam surface 59a is shaped so that clockwise rotation of latch operating lever 56 past the unlock position shown in FIG. 2 does not force lock operating lever 80 counterclockwise past the unlock position via follower pin 87. Thus, this second set of reactions just rotates transfer lever 44 clockwise from the latched position shown in FIG. 5 to an unlatched position pulling intermittent lever 34 and detent 32 down, which unlatches door latch 10. Door handle 136 is now in the unlatch position shown in FIG. 3. It should be noted that sheath connector 116 and the attachment point or hole 61 of inside latch operating lever 56 has moved farther away from anchor bracket 130 and that some slack has been taken up in cable assembly 112. Vehicle door 100 may now be opened.

When inside door handle 132 is released, return spring 52 of door latch 10 returns the inside latch operating lever 56 to the latch position and the inside door handle 136 to the latch position shown in FIG. 2. After the vehicle door is closed, door latch 10 can be locked from the interior of the vehicle simply by rotating door handle 136 counterclockwise to the lock position shown in FIG. 1.

While operator assembly 126 has been illustrated as having a base 128, with a unitary anchor bracket 130, sheath 118 and operator 132 may be attached to different portions of the vehicle door separately, in effect using the vehicle door itself as a base and/or an anchor bracket. Moreover, other alternative operators may be used in place of the specific operator 132 illustrated as stated above.

In other words, many modifications and variations of the present invention in light of the above teachings may be made. It is, therefore, to be understood that, within the scope of the appended claims, the invention may be practiced otherwise than as specifically described.

We claim:

1. In combination, a door latch and a cable actuator system for remote operation of the door latch, the door latch having a first operating lever that is moved in one direction by the cable actuator system via a cam in connection with the first operating lever and a second operating lever that is moved in an opposite direction by the cable actuator system, the cable actuator system having:

a sheath that has a sheath connector at each end, a core that slides in the sheath and that has a core connector at each end, a fixed anchor, an operator that moves with respect to the anchor, the sheath connector at one end being attached to the anchor and the core connector at an adjacent end being attached to the operator so that the core translates with respect to the sheath when the operator is moved, the sheath connector at an opposite end being attached to the first operating lever so that there is slack in the sheath, and the core connector at an opposite end being attached to the second operating lever.

2. The combination as defined in claim 1 wherein the operator rotates the first operating lever to a limit in one direction to unlock the door latch and then continues rotation of the second operating lever in an opposite direction to unlatch the door latch.

3. In combination, a door latch and a cable actuator system for remote operation of the door latch having a first operating lever that is rotated in one direction and a second operating lever that is rotated in an opposite direction by the cable actuator system, the cable actuator system having:

a cable assembly having a sheath that has a sheath connector at each end and a core that slides in the sheath and that has a core connector at each end, an operator assembly having a fixed anchor and an operator that moves with respect to the anchor, the cable assembly having the sheath connector at one end attached to the anchor and the core connector at an adjacent end attached to the operator so that the core translates with respect to the sheath when the operator is moved, the cable assembly having the sheath connector at an opposite end attached to the first operating lever and the core having the core connector at an opposite end attached to the second operating lever, the cable assembly having slack when so attached so that the first and second operating levers rotate toward or away from each other when the operator is moved with respect to the fixed anchor, and the first operating lever having a follower that is engaged by a cam of the second operating lever to coordinate rotation of the first and second operating levers.

4. The combination as defined in claim 1 wherein the first operating lever has limited movement.

5. The combination as defined in claim 3 wherein the first operation lever has limited movement.

6. The combination as defined in claim 3 wherein the first operating lever is a lock operating lever and the second operating lever is a latch operating lever.

7. The combination as defined in claim 3 wherein the sheath connector at the opposite end is substantially coplanar with the core connector at the opposite end.

8. The combination as defined in claim 3 wherein the sheath is longer than a minimum distance between an attachment point of the first operating lever for attaching the sheath connector at the opposite end of the sheath and the anchor.

9. In combination, a door latch and a cable actuator system for remote operation of the door latch, the door latch having a lock operating lever that is rotated in one direction by the cable actuator system via a cam in connection with the lock operating lever to unlock the door latch and a latch operating lever that is rotated in an opposite direction by the cable actuator system, the cable actuator system having:

a cable assembly having a sheath that has a sheath connector at each end and a core that slides in the sheath and that has a core connector at each end, an operator assembly having a fixed anchor and an operator that moves with respect to the anchor, the operator having a handle for moving the operator;

the cable assembly having the sheath connector at one end attached to the anchor and the core connector at an adjacent end attached to the operator so that the core translates with respect to the sheath when the operator is moved by the handle, the cable assembly having the sheath connector at an opposite end attached to the latch operating lever and the core having the core connector at an opposite end attached to the lock operating lever, and the cable assembly having slack when so attached so that the lock and latch operating levers are operated in a predetermined sequence to unlock and then unlatch the door latch when the operator is moved with respect to the fixed anchor in one direction.

10. The combination as defined in claim 9 wherein the lock operating lever has limited movement and a follower that is driven by the cam of the latch operating lever within the limited movement.

11. The combination as defined in claim 10 wherein the sheath connector at the opposite end is substantially coplanar with the core connector at the opposite end.

12. The combination as defined in claim 11 wherein the sheath is longer than the distance between an attachment point of the lock operating lever for attaching the sheath connector and the anchor when the lock operating lever is in a lock position.

13. The combination as defined in claim 12 wherein the attachment point of the lock operating lever moves away from the anchor when the lock operating lever rotates to an unlock position.

* * * * *